United States Patent
Wood

[11] 3,837,800
[45] Sept. 24, 1974

[54] METHOD AND APPARATUS FOR PURIFYING FLUIDS

[75] Inventor: M. Dale Wood, Hasbrouck Heights, N.J.

[73] Assignee: Harold Meltzer, Jersey City, N.J. ; a part interest

[22] Filed: Jan. 11, 1973

[21] Appl. No.: 322,688

Related U.S. Application Data

[63] Continuation-in-part of Ser. No. 140,919, May 6, 1971.

[52] U.S. Cl. .............. 21/54 R, 21/DIG. 2, 210/64
[51] Int. Cl. ............................................. A61l 1/00
[58] Field of Search .......... 21/DIG. 2, 54 R, 102 R; 210/64; 250/430, 432, 436

[56] References Cited
UNITED STATES PATENTS
3,462,597   8/1969   Young .............................. 21/102 R

FOREIGN PATENTS OR APPLICATIONS
733,379   3/1943   Germany ........................... 536/602

OTHER PUBLICATIONS
Unit Operations of Chem. Eng., McCabe & Smith, pp. 63–66, 1967.

Primary Examiner—Frank A. Spear, Jr.
Assistant Examiner—Ferris H. Lander
Attorney, Agent, or Firm—Fitzpatrick, Cella, Harper & Scinto

[57] ABSTRACT

A method and apparatus for continuously purifying a fluid by the emission of ultraviolet rays characterized by a body with a series of spaced, parallel, elongated, cylindrical radiation chambers extending therethrough, and a plurality of elongated, interconnecting chambers having a height substantially less than the diameter of the radiation chambers, a plurality of elongated, ultraviolet ray emitting lamps removably mounted in jackets in the radiation chambers, respectively, and extending from the front to the rear of the radiation chambers. Fluid to be purified is continuously received in an elongated chamber and spread into sheet-like flow attitude and thence passed serially and transversely between the lamp jackets and the walls of the radiation chambers, the walls being in close proximity to the jackets to maintain sheet-like flow for a substantial distance around the periphery of the lamps, and the fluid is maintained in sheet-like flow between adjacent radiation chambers by passing through the interconnecting chambers, and thence the purified liquid is discharged from the last of the radiation chambers.

8 Claims, 6 Drawing Figures

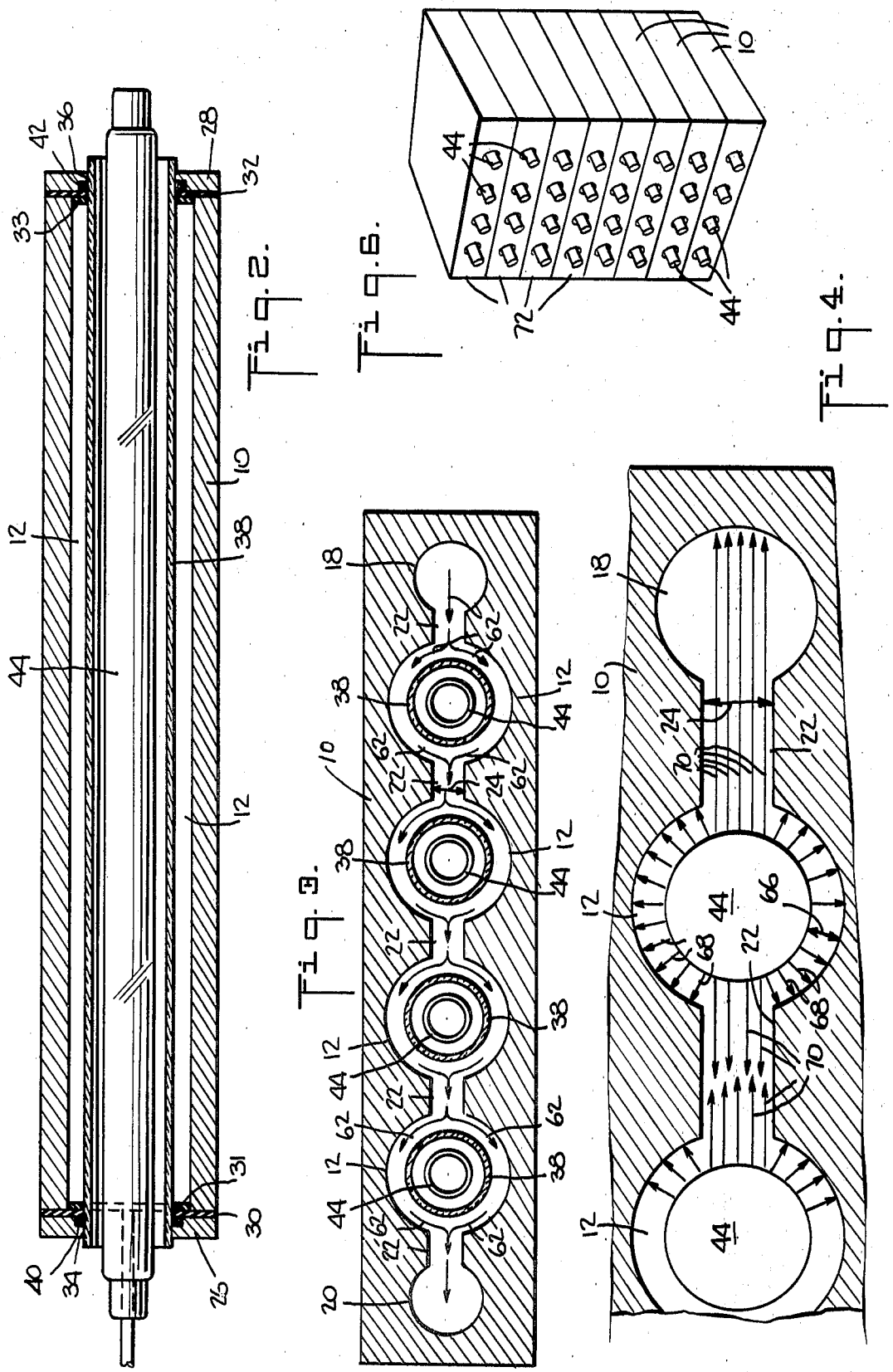

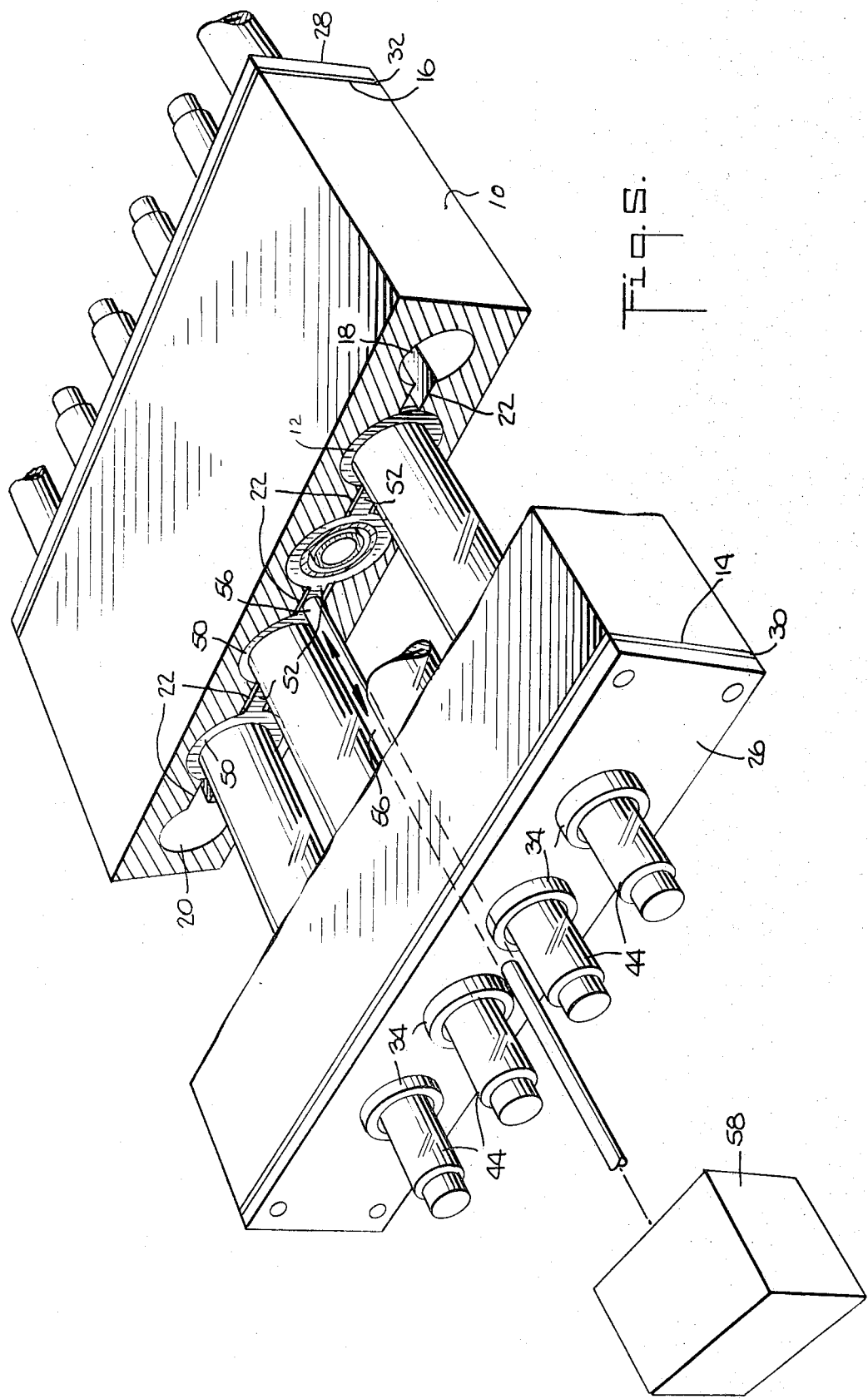

METHOD AND APPARATUS FOR PURIFYING FLUIDS

This application is a continuation-in-part application of my copending application Ser. No. 140,919, entitled "Process and Apparatus for Purification of Materials", filed May 6, 1971.

This invention relates to a new and useful method and apparatus for purifying fluids, and more particularly to ultraviolet ray purification and/or sterilization.

Radiant energy in the ultraviolet region is well-known to have a pronounced lethal effect on micro-organisms. Accordingly, ultraviolet lamps have often been used to purify or sterilize gases and liquids. These lamps emit a high concentration of ultraviolet rays in the range of 2,500 to 2,700 Angstroms, i.e. the range which exhibits germicidal qualities. Thus, germicidal lamps which emit ultraviolet radiations are in wide use today.

In view of the potential health hazards associated with the disposal of sewage, it is necessary to provide for adequate sterilization thereof. Heretofore, some attempts have been made to sterilize sewage by means of ultraviolet light. As one example, U.S. Pat. No. 3,182,193 describes a system wherein liquid passes in intimate contact over ultraviolet lamps. The effectiveness of this system is low because the liquid to be sterilized must be in contact with the ultraviolet lamp so that the germicidal rays may penetrate same. However, because the fluid is made to flow in a generally turbulent manner along the longitudinal axis of a lamp which is disposed in an individual isolated chamber, portions of the fluid tend to pass through the system without being effectively subjected to sufficient radiation. Moreover, complicated monitoring and safety devices are necessary to ensure proper operation of the system. In additional systems, the liquid to be purified is atomized or subjected to a spraying action compensating for the ineffective penetration of the ultraviolet rays such as is disclosed in U.S. Pat. No. 2,485,267. It will be appreciated that the equipment for accomplishing atomization is bulky and expensive. Moreover, these processes cannot accomplish 100 percent kill of the micro-organism population.

The purification of drinking water is also of great importance. Heretofore, municipal water supplies were purified by filtering with the addition of chlorine or the like. Although chlorine is suitable for disinfecting large quantities of water, it tends to impart an undesirable taste to the water and is not in all cases totally effective. In instances where the water supply has a large microbial population, the degree of chlorination necessary for reducing the population to tolerable levels renders the water almost unpalatable.

Accordingly, an object of this invention is to provide a method and apparatus for the elimination of deleterious micro-organisms from fluids and other materials in a facile and economical manner.

The present invention involves a novel combination of features combined in such a way as to afford a very efficient and effective solution to the difficulties encountered with the prior art, as will become apparent as the description proceeds.

In order to accomplish the desired results, this invention provides in one form thereof, a new and improved ultraviolet purifier characterized by a body having a series of spaced, parallel, elongated, cylindrical radiation chambers extending therethrough from the front end to the rear end thereof. The body has a plurality of elongated interconnecting chambers interconnecting the cylindrical radiation chambers and also extending through the body from the front end to the rear end thereof. The height of the interconnecting chambers is substantially less than the diameter of the cylindrical radiation chambers. Fluid inlet means are connected to the first of the cylindrical radiation chambers and fluid outlet means are connected to the last of the cylindrical radiation chambers. A front plate covers the front end of the body in sealed relationship with respect thereto and a rear plate covers the end of the body also in sealed relationship, with respect thereto. These plates have openings corresponding to the ends of the cylindrical radiation chambers and an elongated, cylindrical light transmitting jacket is centrally disposed in each of the cylindrical radiation chambers with the ends thereof extending through said openings. The outside diameter of the jacket is less than the diameter of the cylindrical radiation chamber to provide a fluid flow passage there-between and the jackets are mounted in sealed relationship with respect to the front and rear plates. An elongated, ultraviolet ray emitting lamp is removably mounted in each of the jackets and extends from the front end to the rear end of the body. An electric power source is provided for activating the ray emitting lamps.

In one form of the invention a plurality of interconnected wiping members are provided for frictionally engaging the periphery of the jackets and the walls of the chambers. These wipers are mounted for reciprocal movement between the end plates and in both the extended and retracted positions the wipers present no obstruction to the ultraviolet radiation, or to the fluid flow through the chamber.

According to one form of my invention, I provide a method of continuously purifying a fluid by the emission of ultraviolet rays characterized by the steps of continuously receiving fluid to be purified in an elongated chamber, spreading the fluid into sheet-like flow attitude, and passing the fluid serially, transversely past a plurality of elongated ultraviolet ray lamp means, mounted in the radiation chambers. The chambers have walls in close proximity to the lamps to maintain sheet-like flow a substantial distance around the periphery of the lamps. The sheet-like flow is maintained between adjacent chambers by passing the fluid through elongated interconnecting chambers interconnecting the radiation chambers, said interconnecting chambers having a height substantially less than the diameter of the radiation chambers. Thence, purified fluid is discharged from the last of the series of radiation chambers.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the construction on which this disclosure is based may readily be utilized as the basis for the designing of other structures for carrying out the several purposes of the invention. It is important, therefore, that this disclosure be regarded as including such equivalent constructions as do not depart from the spirit and scope of the invention.

One embodiment of the invention has been chosen for purposes of illustration and description and is shown in the accompanying drawings forming a part of the specification, wherein:

FIG. 2 is an enlarged, longitudinal, sectional view taken along the line indicated at 2—2 in FIG. 1;

FIG. 3 is an enlarged, transverse, sectional view taken along the line indicated at 3—3 in FIG. 1;

FIG. 4 is an enlarged, fragmentary, transverse, sectional view showing the action of the ultraviolet rays;

FIG. 5 is a perspective view, partially broken away, of the ultraviolet purifying unit, and showing the action of the wiper assembly; and FIG. 6 is a perspective view, drawn on a reduced scale, of a plurality of stacked ultraviolet purifying units.

Figure 1:
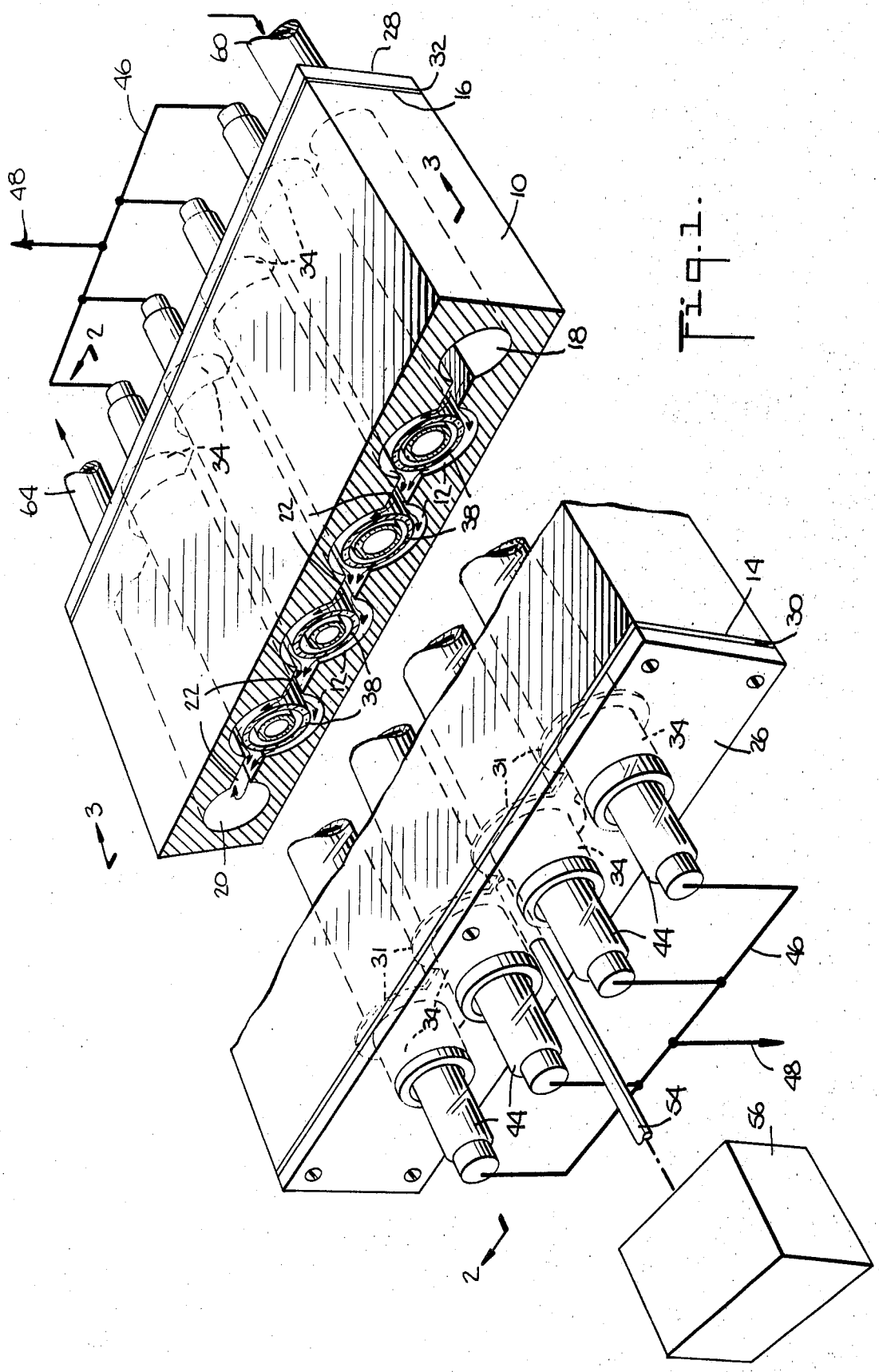
FIG. 1 is a perspective view, partially broken away, of an ultraviolet purifier constructed in accordance with the concepts of my invention.

According to the invention, an elongated, thin, flat body 10, FIGS. 1 and 5, is fabricated from a suitable material such as stainless steel, aluminum, fiber-glass, plastic, for example. As best seen in FIGS. 1 and 3, the body 10 has a plurality of spaced, parallel, elongated cylindrical radiation chambers 12, extending therethrough from the front end 14 to the rear end 16, thereof. A first elongated cylindrical chamber 18 serves as a fluid inlet chamber, and a last elongated, cylindrical chamber 20 serves as a fluid outlet chamber. Preferably, the inlet chamber and the outlet chamber are of reduced diameter with respect to the cylindrical radiation chambers 12.

As seen in FIGS. 1 and 3, the body 10 is also provided with a plurality of elongated, interconnecting chambers 22 interconnecting adjacent cylindrical radiation chambers 12, and the inlet and outlet chamber 18 and 20, respectively. As best seen in FIGS. 3 and 4, the height 24 of the interconnecting chamber 22 is substantially less than the diameter of the cylindrical radiation chambers. Such height preferably is less than about ½ inch, for a purpose which will be described more fully hereinafter. Referring to FIGS. 1 and 5, a front plate 26 covers the front end of the body 10 and a rear plate 28 covers the rear end thereof. The front plate is sealed with respect to the body by means of a seal plate 30 and a gasket 31, FIG. 2, and a seal plate 32 and gasket 33 provide a seal between the rear plate 28 and the rear wall 16 of the body 10. As best seen in FIGS. 1 and 2, the front plate 26 is provided with openings 34 and the rear plate 28 is provided with openings 35 corresponding to the ends of the cylindrical radiation chambers 12, respectively. An elongated, cylindrical light emitting sleeve or protective jacket 38 is centrally mounted in each of the cylindrical radiation chambers. This jacket may be manufactured from any suitable materials such as quartz, for example. It will be appreciated that the outside diameter of the jacket is less than the diameter of the cylindrical radiation chambers to provide a fluid flow passage therebetween. The jackets extend through the openings 34 and 36 in the front and rear plates 26 and 28, respectively, and are sealed with respect thereto as by means of "O" rings 40 and 42, FIG. 2, respectively.

An elongated ray emitting lamp 44 is removably mounted in each of the jackets 38. Power lines 46 connect the lamp 44 to a power source 48. Any suitable lamps and power source may be employed such as lamps that emit a high concentration of ultraviolet rays in the range of 2,500 to 2,700 Angstroms, i.e. a range which exhibits germicidal qualities, for example. High frequencies of the order of about 5 to about 20 khz, such as is disclosed in my copending application Ser. No. 140,919 filed May 6, 1971, may be employed. It will thus be appreciated that the positioning of the lamps 44 inside the jackets 38 permits the replacement of the lamps without disassembly of the apparatus and without the necessity of turning-off the flow of fluid through the unit. Also, in view of the fact that the lamps are not in direct physical contact with the passing fluid, they may be designed for higher operating temperatures without adverse effects.

As best seen in FIG. 5, a plurality of wiping members 50 are interconnected by connecting members 52. These members carry a fabric or rubber-like surface which frictionally engages the periphery of the jackets as well as the walls of the chambers 12 and 22 to prevent build-up of foreign material deposits thereon. A rod 54 is connected to the members, as at 56, and extends out through the front plate 26. An actuating member 58, which may be a manually actuatable knob or a power-operated mechanism, is connected to the outer end of the rod 54 for moving the wipers between the front and rear plates. It will be appreciated that the wipers may be periodically operated while the unit is in operation and in both their extended and retracted positions present no obstruction to the ultraviolet radiation or to the fluid flow through the radiation chambers.

In operation, a fluid, such as water, for example, to be purified, enters the inlet chamber 18 through an inlet connection 60, FIG. 1. In the inlet chamber and in the adjacent interconnecting chamber 22, the water is induced to assume a sheet flow attitude. The restriction of this portion of the unit serves to spread the water substantially evenly from the front to the rear, and avoids packing the water at the end of the unit. The water then passes in flow attitude, without substantial turbulence, around the ultraviolet ray emitting lamps 44 and progressively past each lamp from the right to the left, as viewed in FIG. 3, as indicated by arrows 62. The water then passes from the last cylindrical radiation chamber into the fluid outlet chamber 20 from where it is discharged in purified condition from an outlet connection 64, FIG. 1. I have discovered that high ultra-violet intensity is more effective in obtaining bacterial kill than long dwell time at low intensity. Accordingly, I have reduced the fluid wall thickness, as indicated at 66, FIG. 4, to a minimum such as less than about ¼ inch, for example, and extended this wall around the maximum periphery of the ultra-violet radiation source by providing the height 24 of the interconnecting chambers 22 at a value substantially less than the diameter of the cylindrical radiation chambers 12. Without this flow restriction between the radiation chambers, the dwell time of the water near the radiation lamps would be too short for effective "kill" action of the bacteria. Thus, as seen in FIG. 4, the area of high radiation, as indicated by the arrow 68, extends around a substantial portion of the periphery of the radiation source 44, and the diametral radiation, as indicated by the arrow 70, extends into the interconnecting chambers 22 and the inlet and outlet chambers. It has been found that a dwell time of the order of about 6 seconds in the unit provides a 100 percent bacterial kill, i.e. 150,000 bacteria per milleliter, which is substantially greater than that required by Public Health regulations.

Referring to FIG. 6, there is shown a plurality of units 72, constructed as aforesaid, mounted in stacked relationship one above the other. This provides a compact system whereby a large quantity of fluid can be readily handled, while being assured that all of the fluid will flow, closely adjacent a source of radiation. Replacement of the ultraviolet ray emitting lamps 44, can be readily effected without interrupting the flow of fluid through the unit.

It will thus be seen that the present invention does indeed provide an improved, ultraviolet purifier which is superior in simplicity, compactness, small-size, operability, reliability, economy and efficiency as compared to prior art such devices.

Although a particular embodiment of the invention is herein disclosed for purposes of explanation, various modifications thereof, after study of the specification, will be apparent to those skilled in the art to which the invention pertains.

What is claimed and desired to be secured by letters patent is:

1. An ultraviolet purifier unit comprising a body having a series of spaced, parallel, elongated, cylindrical, radiation chambers extending through said body from the front end to the rear end thereof, said body having a plurality of elongated interconnecting chambers interconnecting said cylindrical radiation chambers, and extending through said body from the front end to the rear end thereof, the height of said interconnecting chambers being substantially less than the diameter of said cylindrical radiation chambers and being less than about one-half inch, fluid inlet means connected to the first of said cylindrical radiation chambers and fluid outlet means connected to the last of said cylindrical chambers, a front plate covering the front end of said body and a rear plate covering the rear end of said body, sealing means for sealing the front plate with respect to said body and sealing means for sealing the rear plate with respect to said body, said front and rear plates having openings therein corresponding to the ends of said cylindrical radiation chambers, an elongated, cylindrical light transmitting jacket being centrally mounted in each of said cylindrical radiation chambers, the outside diameter of said jacket being less than the diameter of said cylindrical radiation chamber to provide a fluid flow passage therebetween having a height of less than about ¼ inch, said jackets extending through said openings in the front and rear plates, sealing means for sealing said jackets with respect to said front and rear plates, and elongated ultraviolet ray emitting lamps removably mounted in said jackets, respectively, and extending from said front end to said rear end 2. An ultraviolet purifying unit according to claim 1 comprising a plurality of interconnecting wiping members for frictionally engaging the periphery of said jackets and the walls of said chambers, a rod connected to said wiping members, said rod extending through one of said plates for reciprocal movement to move said wipers from one of said plates to the other of said plates.

3. An ultraviolet purifying unit according to claim 1 wherein said fluid inlet means comprises an elongated, cylindrical chamber disposed in parallel relationship with respect to said cylindrical radiation chambers and extending through said body from the front end to the rear end thereof, and being interconnected with the first of the series of radiation chambers by an elongated interconnecting chamber, said fluid inlet chamber having a fluid inlet connection; and wherein said fluid outlet means comprises an elongated cylindrical chamber disposed substantially parallel to said cylindrical radiation chambers and being interconnected to the last of the series of radiation chambers by an elongated interconnecting chamber, said fluid outlet chamber having an outlet connection.

4. An ultraviolet purifying unit according to claim 1 wherein said sealing means for sealing the front plate with respect to said body comprises a seal plate and a gasket interposed between said front plate and said body, and said sealing means for sealing the rear plate with respect to said body comprises a seal plate and a gasket interposed between said rear plate and said body.

5. An ultraviolet purifying unit comprising a body having a series of spaced, parallel, elongated, cylindrical, radiation chamber extending through said body from the front end to the rear end thereof, said body having a plurality of elongated interconnecting chambers interconnecting said cylindrical radiation chambers, and extending through said body from the front end to the rear end thereof, fluid inlet means connected to the first of said cylindrical radiation chambers and fluid outlet means connected to the last of the series of said cylindrical chambers, said fluid inlet means comprising an elongated, cylindrical chamber disposed in parallel relationship with respect to said cylindrical radiation chambers and extending through said body from the front end to the rear end thereof, and being interconnected with the first of the series of radiation chambers by an elongated interconnecting chamber, said fluid inlet chamber having a fluid inlet connection, said fluid outlet means comprising an elongated cylindrical chamber disposed substantially parallel to said cylindrical radiation chambers and being interconnected to the last of the series of radiation chambers by an elongated interconnecting chamber, said fluid outlet chamber having an outlet connection, the height of said interconnecting chambers being less than about one-half inch and being substantially less than the diameter of said cylindrical radiation chambers, a front plate covering the front end of said body and a rear plate covering the rear end of said body, sealing means for sealing the front plate with respect to said body and sealing means for sealing the rear plate with respect to said body, said sealing means for sealing the front plate with respect to said body comprising a seal plate and a gasket interposed between said front plate and said body, and said sealing means for sealing the rear plate with respect to said body comprising a seal plate and a gasket interposed between said rear plate and said body, said front and rear plates having openings therein corresponding to the ends of said cylindrical radiation chambers, an elongated, cylindrical light transmitting jacket being centrally mounted in each of said cylindrical radiation chambers, the outside diameter of said jacket being less than the diameter of said cylindrical radiation chamber to provide a laminar fluid flow passage therebetween, the height of said passage being less than about ¼ inch, said jackets extending through said openings in the front and rear plates, sealing means for sealing said jackets with respect to said front and rear plates, elongated ultraviolet radiation lamps being removably mounted in said jackets, respectively, and extending from said front and to said rear end, an electric power source for activating said radiation lamps, a plurality of interconnecting wiping members for frictionally engaging the periphery of said jackets and the walls of said chamber, a rod connected to said wiping members, said rod extending through one of said plates for reciprocal movement to move said wipers from one of said plates to the other of ssid plates.

6. A method of continuously purifying a fluid by the emission of ultraviolet rays comprising the steps of continuously receiving fluid to be purified in an elongated chamber, spreading said fluid into sheet-like flow attitude, passing said fluid serially, transversely past a plurality of elongated ultraviolet radiation lamps mounted in said radiation chambers having walls in close proximity to the lamps to maintain sheet-like flow of less than about ¼ inch around the periphery of said lamps, while maintaining said sheet-like flow between adjacent radiation chambers by passing said fluid through elongated interconnecting chambers connecting said radiation chambers, said interconnecting chambers having a height substantially less than the diameter of the radiation chambers, and discharging purified fluid from the last of said series of radiation chambers.

7. A method of continuously purifying a fluid by the emission of ultraviolet rays according to claim 6 further comprising the steps of periodically frictionally engaging the periphery of the radiation lamps and the walls of said chambers with a plurality of interconnected wiping members by reciprocating said wiping members longitudinally of said lamps from one end of said chamber to the opposite end thereof.

8. An ultraviolet purifier unit comprising a body having at least one elongated, cylindrical, radiation chamber extending through said body from the front end to the rear end thereof, an elongated, cylindrical fluid inlet chamber disposed in parallel relationship with respect to said cylindrical radiation chamber and extending through said body from the front end to the rear end thereof, and being interconnected with said radiation chamber by an elongated interconnecting chamber extending through said body from the front end to the rear end thereof, said fluid inlet chamber having a fluid inlet connection; an elongated cylindrical fluid outlet chamber disposed substantially parallel to said cylindrical radiation chamber and being interconnected with said radiation chamber by an elongated interconnecting chamber and extending through said body from the front end to the rear end thereof, said fluid outlet chamber having an outlet connection, the height of said interconnecting chambers being substantially less than the diameter of said cylindrical radiation chamber and being less than about one-half inch, a front plate covering the front end of said body and a rear plate covering the rear end of said body, sealing means for sealing the front plate with respect to said body and sealing means for sealing the rear plate with respect to said body, said front and rear plates having openings therein corresponding to the ends of said cylindrical radiation chamber, an elongated, cylindrical light transmitting jacket being centrally mounted in said cylindrical radiation chamber, the outside diameter of said jacket being less than the diameter of said cylindrical radiation chamber to provide a fluid flow passage therebetween having a height of less than about ¼ inch, said jacket extending through said openings in the front and rear plates, sealing means for sealing said jacket with respect to said front and rear plates, and an elongated ultraviolet ray emitting lamp removably mounted in said jacket and extending from said front end to said rear end.

* * * * *